G. H. GIBSON.
MEASURING APPARATUS.
APPLICATION FILED MAR. 15, 1913.
1,202,053.
Patented Oct. 24, 1916.
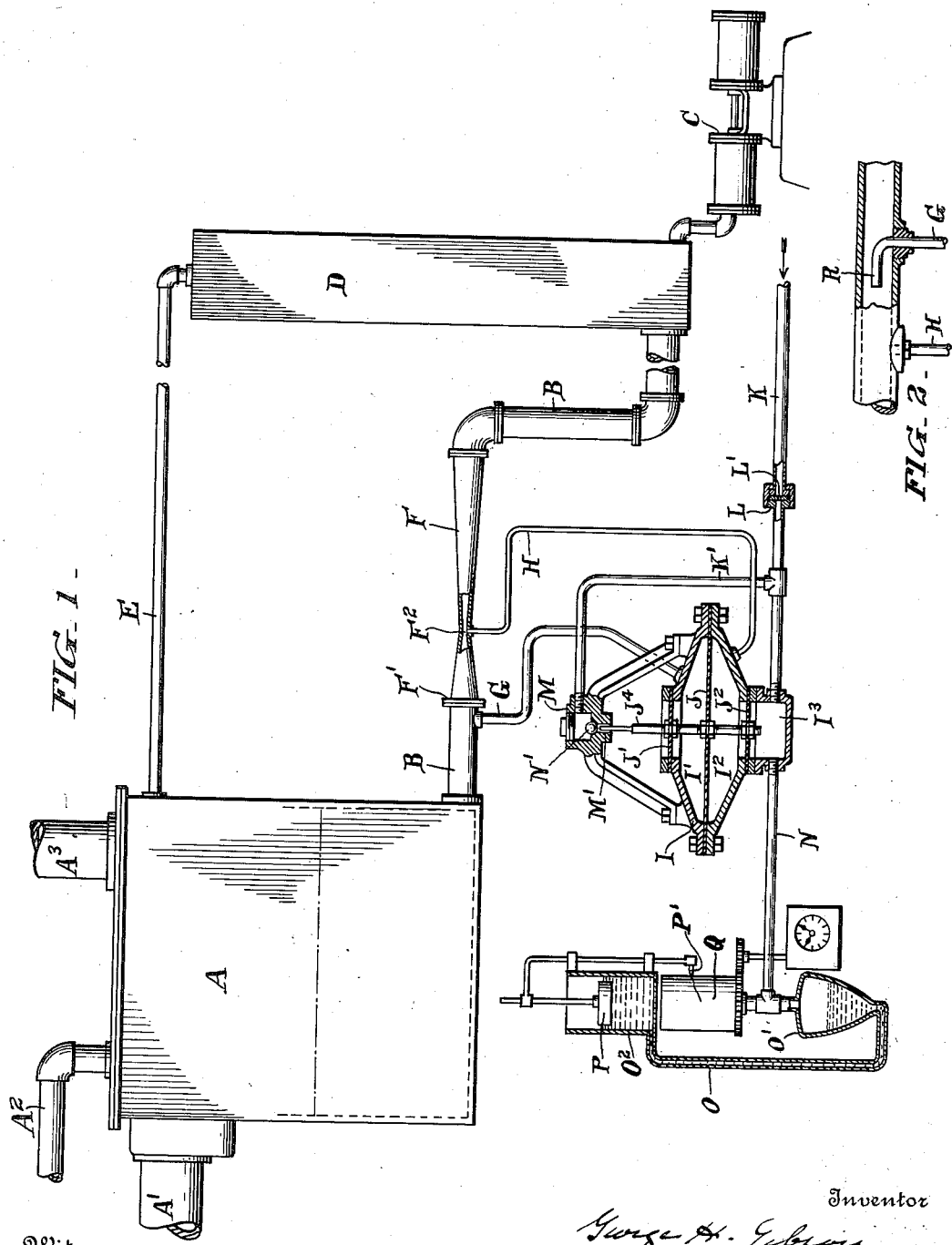

UNITED STATES PATENT OFFICE.

GEORGE H. GIBSON, OF MONTCLAIR, NEW JERSEY.

MEASURING APPARATUS.

1,202,053.  Specification of Letters Patent.  Patented Oct. 24, 1916.

Application filed March 15, 1913. Serial No. 754,460.

*To all whom it may concern:*

Be it known that I, GEORGE H. GIBSON, a citizen of the United States of America, residing in Montclair, in the county of Essex and State of New Jersey, have invented a certain new and useful Improvement in Measuring Apparatus, of which the following is a true and exact description, reference being had to the accompanying drawings, which form a part thereof.

My present invention relates to means for measuring flowing liquid, and the primary object of my invention is to provide effective and relatively simple and inexpensive means adapted to measure boiler feed water and especially pre-heated boiler feed water as it is passed to the boiler, and for measuring other flowing liquids where analogous flow and pressure conditions prevail.

More specifically, the object of my invention is to provide means whereby a Venturi tube meter, a Pitot tube measuring device, or other analogous means, may be employed under conditions such as are experienced when the liquid to be measured is water passing with a relatively low velocity head from the hot well of a condenser or from an open feed water heater to a boiler feed pump located at a level but slightly below the level of the water in the hot well or heater.

Heretofore it has been found impracticable, or at least unsatisfactory, to place a Venturi tube meter in a boiler feed line. When such a meter is placed in the boiler feed line between the usual reciprocating or other displacement feed pump and the boiler, the fluctuations in flow due to the operation of the pump tend to materially reduce the accuracy of the measurements obtained. To minimize the injurious consequences of such fluctuations, it has been proposed to provide the pump with an air cushioning cylinder. Such a chamber must be of considerable size to make it effective at all, and in many cases it has been found necessary to supply compressed air to the chamber either continuously or at frequent intervals to make up for the loss of air which is continually being absorbed by the water pumped. In consequence, the use in connection with a boiler feed pump of an air cushioning chamber of sufficient size to be effective is generally regarded as impracticable. Furthermore, a Venturi tube meter so located must be a high ratio meter; *i. e.*, one in which there is a marked difference in cross sectional area between the high and low pressure zones of the meter. This is objectionable for the reason that it involves a loss of head which add materially to the work of the pump. The use of a Venturi tube meter in a boiler feed line at the suction side of the feed pump is also open to objections quite as serious as those referred to above, and in some respects even more serious. The fluctuations in flow are, of course, as bad on one side of the pump as on the other. Furthermore, with a high ratio Venturi tube meter located on the suction side of the pump there is a marked tendency of the stream through the meter to break at the low pressure zone on the suction stroke of the pump, especially when the liquid is heated to a temperature at which its vapor tension is but little below the hydrostatic pressure in the high pressure zone of the meter. The Pitot tube measuring device like the Venturi meter is adversely affected by fluctuations in flow, although with it there is not the same tendency for the liquid stream to break under certain conditions as is experienced with the Venturi meter. The Pitot tube measuring device is in general, however, a less satisfactory measuring device than the Venturi tube meter for service of the character mentioned, because it is more apt to clog up and gives, with the usual velocities of water in feed pipes, a much smaller differential pressure from which the rate of flow is determined. In consequence of the objections attending the use of Venturi tube meters and Pitot tube measuring devices for measuring boiler feed water and especially pre-heated boiler feed water, it has become a common practice where it is desired to measure this water, to pass the water through a weir chamber and to determine the rate of flow from the varying accumulation of water on the supply side of the weir over which it flows. Weir measuring apparatus operates satisfactorily for this purpose, but is open to the objection that it is bulky and takes up a good deal of space which is sometimes very valuable, and the apparatus is relatively expensive.

To overcome the objections which have hitherto prevented the successful use of a Venturi tube meter or a Pitot tube measuring device for measuring boiler feed water, I place a measuring pipe section, which may be either a Venturi tube or a plain pipe section with Pitot tube connections thereto, in the boiler feed line, and connect this measuring section at each end to a correspondingly located flow equalizing reservoir, and provide means for maintaining the upper portions of said reservoirs filled with gaseous fluid at the same pressure. With this arrangement the rate of flow through the measuring pipe section will be in direct response to the gravity head due to the difference in height of liquid levels in the two reservoirs and will be only indirectly affected by the operation of the pump. For instance, where the boiler feed pump draws water from the hot well of a condenser or from an open feed water heater, the flow equalizing reservoir at one end of the measuring pipe section may be the hot well or open feed water heater, and at the other end, a stand pipe interposed between the measuring section and the suction inlet of the pump, and preferably located immediately adjacent the latter. In this arrangement the vapor space of the hot well or open feed water heater should be connected to the upper end of the stand pipe by a vapor equalizing connection. With this arrangement the pump draws water in a more or less irregular manner from the stand pipe or reservoir. The water level in the latter rises and falls with the pulsations in flow through the pump, but the flow into the reservoir is to a large extent free from the momentary fluctuations due to the operation of the pump and approximates the average rate of flow required to supply the amount of water withdrawn from the reservoir by the pump. The equalization of the flow through the meter resulting from the use of the pressure equalizing reservoir substantially reduces the velocity head in the meter necessary for satisfactory operation. This means in practice that the water level in the heater may be substantially lower relative to the suction inlet of the pump than would otherwise be required. To enable me to still further reduce the velocity head required in a Pitot tube measuring device or Venturi tube meter employed, and thus minimize the frictional loss of head which would occur if the Pitot tube were placed in a smaller pipe or if a higher ratio Venturi tube meter were employed, I preferably employ in connection with either form of measuring device a differential pressure measuring means which is adapted to magnify the actual difference in pressure existing between the low and high pressure points of the Venturi tube meter or the Pitot tube measuring device.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described forms in which my invention may be used.

Of the drawings: Figure 1 is a somewhat diagrammatic elevation partly broken away and in section of a boiler feed water system in which a Venturi tube meter is arranged in accordance with my present invention. Fig. 2 is a partly sectional elevation of a portion of a boiler feed water system which may be similar to that shown in Fig. 1, except that a Pitot tube measuring device is employed in place of a Venturi tube meter.

In the drawings A represents an open feed water heater of well known type, $A'$ being the steam supply pipe, $A^2$ the water supply pipe, and $A^3$ the vent pipe connection thereto. The hot water is drawn from the heater through a pipe B by a reciprocating boiler feed pump C located at a level which needs to be but slightly below the normal water level in the feed water heater. The pipe B instead of leading directly to the suction inlet of the pump C opens into a stand pipe or reservoir D, which is also connected to the suction inlet of the pump. Advantageously the connection between the stand pipe and pump is as short as is conveniently possible.

E represents a vapor equalizing pipe connection between the top of the heater A and the top of the stand pipe D.

Included in the pipe B at any convenient place along the length of the latter is a Venturi tube section F which ordinarily and preferably is a low ratio tube; that is, one in which the difference between the cross sectional areas of the high pressure zone $F'$ and the low pressure zone $F^2$ is comparatively small. Pipes G and H run from the zones $F'$ and $F^2$ of the Venturi tube section F to the chambers $I'$ and $I^2$ respectively, of a differential pressure balancing device I. As shown, the two chambers $I'$ and $I^2$ are separated by a flexible diaphragm J and portions of the walls of the chambers $I'$ and $I^2$ are formed by flexible diaphragms $J'$ and $J^2$. The three diaphragms J, $J'$ and $J^2$ are parallel and coaxial, but the diaphragms $J'$ and $J^2$, which are similar in size to each other, are smaller than the diaphragm J. The device I is formed with a third chamber $I^3$ separated from the chamber $I^2$ by a diaphragm $J^2$. The chamber $I^3$ receives a fluid under the proper pressure to balance the differential of the fluid pressures acting on the opposite sides of the diaphragm J. This pressure fluid is supplied by the pipe K which includes a flow reducing device in the form of a plate L formed with a small restricted orifice $L'$ through which only a relatively slow flow of the pressure fluid can take place. The pipe K leads from any suitable source of fluid under pressure exceeding the maximum balancing pressure required in the chamber I. The pressure fluid employed may be steam, water, compressed air or the like. Ordinarily I prefer to use compressed air for this purpose. A branch pipe K' leads from the pipe K between the chamber I³ and the apertured plate L to a valve casing M. The latter is formed with a vent port M' opening to the atmosphere and controlled by a ball valve N' which normally tends to seat against and close the port M'. This port is coaxial with the diaphragms J, J' and J² and the rod J⁴ connecting these diaphragms at their centers is formed with an extension entering the port M' and arranged to lift the valve N' off its seat on a slight upward movement of the diaphragms and to permit the valve to seat on a slight downward movement of the diaphragms.

With the arrangement described it will be apparent that when the pressure in the balancing chamber I³ becomes momentarily too high the valve N' is lifted off its seat thus permitting the pressure fluid to escape through the port M' until the desired equilibrium is reëstablished. When the pressure in the balancing chamber becomes momentarily too low the constant influx of pressure fluid through the restricted port L' (port M' being closed) quickly builds up the pressure in the chamber I³ to the required amount. A pressure is thus automatically maintained in the chamber I³ which is that required to balance the differential of the forces acting on the opposite sides of the diaphragm J. It will be apparent of course that the operation of the apparatus is practically independent of the actual pressure in the pipe K at the inlet side of the port L' provided only that this pressure exceeds the maximum pressure required in the balancing chamber I³.

To obtain a record of the balancing pressure in the chamber I³ and consequently of the rate of flow through the pipe B, the chamber I³ is connected as by the pipe N to a U tube O which is partly filled with mercury or some other suitable fluid. The U tube O opens at the upper end of one leg into a float chamber O² receiving a float P which carries a pencil or other device P' for making a record on the clock driven drum Q. The other leg O' of the U tube, to the upper end of which the pipe N is connected, is preferably of such varying cross section with reference to the operating characteristics of the Venturi tube meter or other measuring device employed that the height of liquid level in the float chamber O² which may be cylindrical will vary proportionally with the rate of flow through the meter. As is well known, the difference between the pressures at the zones F' and F² of the meter shown, while varying in accordance with changes in the rate of flow through the meter, is not a linear function of the rate of flow.

The differential pressure balancing mechanism and the U tube recording and rectifying instrument shown and described are not specifically claimed herein, but are disclosed in detail and claimed in my prior application Serial No. 716,803, filed August 24, 1912. It is not essential to the use of the invention claimed herein that the particular type of differential pressure measuring and recording apparatus shown be employed. I consider it highly desirable, however, to employ a differential pressure measuring apparatus which, like that shown, will multiply the actual pressure differential existing in the Venturi tube meter or other velocity meter employed, and the particular form of pressure balancing and recording mechanism illustrated I consider the best of all forms of mechanism for this purpose now known to me.

With the apparatus described it will be apparent that the stand pipe or flow equalizing reservoir D will absorb practically all of the momentary fluctuations in flow due to the operation of the reciprocating pump C so that the flow through the pipe B and meter tube section F will be fairly steady. It will be apparent, moreover, that an increase in the length of the pipe B will add to, rather than diminish, the effectiveness of the apparatus, for the greater the inertia of the stream flowing through the pipe B the smaller will be the effect on the flow through the meter of the fluctuations in level in the chamber D caused by the operation of the pump C. With a stand pipe or reservoir D of suitable size the pump will operate nearly as well as if it were directly connected to the outlet connection of the heater.

In Fig. 2 the pipes G and H leading to the pressure measuring and recording apparatus, which may be similar to that shown in Fig. 1, are connected respectively to the Pitot tube R and directly to the pipe B at any convenient place in the neighborhood of the Pitot tube R. As already explained, much the same advantages are obtained with the Pitot tube as with the Venturi tube meter when used in accordance with the present invention. In general, however, I consider the Venturi tube meter preferable to the Pitot tube measuring device for service of this character.

While in accordance with the provisions of the statutes, I have illustrated and described the best forms of my invention now known to me, it will be apparent to those skilled in the art that changes may be made in the form of the apparatus disclosed without departing from the spirit of my invention, and that under some conditions certain features of my invention may be used without a corresponding use of other features. In particular, the invention disclosed is obviously adapted for use where the differential pressure measuring apparatus, instead of being connected to a Venturi meter or a Pitot tube, is connected to any two points of the boiler feed line or other conduit between which the resistance to flow creates a differential pressure corresponding to the rate of flow and of sufficient magnitude to permit the rate of flow to be determined therefrom.

Having now described my invention, what I claim as new and desire to secure by Letters Patent, is:

1. The combination with a liquid flow line and a pump for causing liquid to flow therethrough, said flow line comprising a measuring pipe section and a flow equalizing reservoir interposed between one end of the measuring section and the pump, a second flow equalizing reservoir to which the other end of said section is connected, means for maintaining the upper portions of said reservoirs filled with gaseous fluid at the same pressure whereby the rate of flow through said section will be responsive to the gravity head due to the difference in liquid levels in the two reservoirs, and means for determining the rate of flow through said measuring section from the difference in pressure created at separated points in said pipe by the flow therethrough.

2. The combination with a liquid flow line and a pump for causing liquid to flow therethrough, said flow line comprising a measuring pipe section and a flow equalizing reservoir interposed between one end of the measuring section and the pump, a second flow equalizing reservoir to which the other end of said section is connected, means for maintaining the upper portions of said reservoirs filled with gaseous fluid at the same pressure whereby the rate of flow through said section will be responsive to the gravity head due to the difference in liquid levels in the two reservoirs, and means for magnifying the difference in pressure created at separated points in said pipe by the flow therethrough, and for thereby measuring the rate of flow through said pipe.

3. The combination with a reservoir of a pipe and a pump for drawing liquid from said reservoir through the pipe, means for determining the rate of flow through said pipe from the difference in pressure created at separated points in said pipe by the flow therethrough, a flow equalizing reservoir through which said pipe is connected to the suction inlet of the pump and means for maintaining the upper portions of said reservoirs filled with gaseous fluid at the same pressure.

4. The combination with a closed chamber, a pipe and a pump for drawing liquid through the pipe from said chamber, the latter having its surface level but little above the suction inlet of the pump, said pipe including means for creating a difference in pressure at separated points corresponding to the rate of flow through the pipe, of means for magnifying this pressure differential and for determining the rate of flow through the pipe therefrom, and a flow equalizing chamber extending higher than the surface level of the liquid in said closed chamber through which said pipe is connected to the suction inlet of the pump, and a vapor equalizing pipe connecting the vapor spaces of said chambers.

5. The combination with a source of liquid, a pipe and a pump for drawing liquid through the pipe from said source, the latter having its surface level but little above the suction inlet of the pump, said pipe including means for creating a difference in pressure at separated points corresponding to the rate of flow through the pipe, of means for magnifying this pressure differential and for determining the rate of flow through the pipe therefrom, a flow equalizing chamber through which said pipe is connected to the suction inlet of the pump, and means for maintaining gaseous fluid in the upper end of said chamber under the same pressure as that acting upon the surface level of said liquid source.

GEORGE H. GIBSON.

Witnesses:
J. RALPH GIBSON,
EUGENE L. LARKIN.